United States Patent [19]

Schneider et al.

[11] 3,906,065
[45] Sept. 16, 1975

[54] PROCESS FOR THE PRODUCTION OF SHAPED, MARBLED THERMOPLASTIC PRODUCTS

[75] Inventors: Ernst Schneider, Troisdorf; Manfred Simon, Niederkassel; Richard Weiss, Troisdorf; Alexander Höver, Troisdorf-Oberlar; Christian Treutler, Troisdorf-Spich, all of Germany

[73] Assignee: Dynamit Nobel Aktiengesellschaft, Germany

[22] Filed: Nov. 26, 1973

[21] Appl. No.: 418,884

Related U.S. Application Data

[63] Continuation-in-part of Ser. No. 137,964, April 27, 1971, abandoned.

[30] Foreign Application Priority Data

Apr. 28, 1970 Germany.......................... 2020758

[52] U.S. Cl. ..................... 264/40; 264/68; 264/75; 264/211; 264/245; 264/349
[51] Int. Cl. ............................ B29f 3/12; B29c 9/00
[58] Field of Search ....... 264/75, 73, 245, 117, 349, 264/40, 211, 68; 260/34.2, 38.2 R

[56] References Cited
UNITED STATES PATENTS

| | | | |
|---|---|---|---|
| 2,103,546 | 12/1937 | Morrell | 264/75 |
| 2,477,170 | 7/1949 | Broderson et al. | 264/75 |
| 3,030,330 | 4/1962 | Cines et al. | 264/349 |
| 3,048,557 | 8/1962 | Siddall | 260/34.2 |
| 3,090,763 | 5/1963 | Hillier | 260/34.2 |
| 3,388,196 | 6/1968 | Farrell | 264/75 |

OTHER PUBLICATIONS

"Extrusion of Plastics," E. G. Fisher, 1964, Interscience Publishers, N.Y., N.Y., p. 154.

*Primary Examiner*—Jeffery R. Thurlow
*Attorney, Agent, or Firm*—Craig & Antonelli

[57] ABSTRACT

A process for the production of shaped, marbled thermoplastic products from themoplastic powder comprising heating a mixture of the thermoplastic powder, a plasticizer and a suitable coloring agent to an elevated temperature and thereafter mixing and cooling the smeary, liquid-like mass thereby produced until it changes into discrete sandlike flowable agglomerates, feeding at least two batches of differently colored agglomerates into an extruder via alternately controlled metering means and thereafter extruding the thermoplastic agglomerates from the extruder.

27 Claims, No Drawings

PROCESS FOR THE PRODUCTION OF SHAPED, MARBLED THERMOPLASTIC PRODUCTS

CROSS-REFERENCE TO RELATED APPLICATIONS

The present application is a continuation-in-part of application Ser. No. 137,964, filed Apr. 27, 1971, now abandoned, the disclosure of which is incorporated herein by reference.

BACKGROUND OF THE INVENTION

This invention relates to a process for producing shaped, marbled thermoplastic products in the form of sheets, films, plates, profiled elements, and the like, wherein metered amounts of differently colored thermoplastic materials are alternatively introduced into an extruder.

In the production of colored plastic objects by extrusion techniques, it is conventional to compound the plastic material in powder form together with an appropriate dye or pigment, plasticizer, lubricants, and so forth prior to the extrusion procedure. The compounded composition is mixed and heated to an elevated temperature, 160°C for polyvinylchloride for example, until a more or less homogeneous mixture of the ingredients is formed. The heated mixture so made usually has a consistency of a uniform smeary mass (such as a very viscous liquid) and is unsuitable for directly feeding into an extruder since it is not uniformly flowable. Accordingly, it is conventional to pass the material through calender rolls or other devices so that the compounded thermoplastic material is formed into a shaped article. This shaped article is allowed to harden and then is comminuted into a prefabricated extruder feed material, such as granules, chips or pellets. This prefabricated extruder feed material is then fed to the extruder where it is extruded into the desired shaped article.

When it is desired to produce extruded thermoplastic artcles having a multi-colored marbled appearance, modifications of the foregoing technique are usually employed. In accordance with one modification, two or more pigments and/or dyes are added to the thermoplastic powder when it is compounded so that the granules, chips or pellets produced by calendering and comminuting have a marbled, multi-colored appearange. These multi-colored granules, chips or pellets are directly fed to the extruder and extruded into a multi-colored, marbled product. Alternatively, two distinct batches of prefabricated granules, chips or pellets can be produced, each batch having its own distinctive color. Thereafter, suitable amounts of granules, chips or pellets of each batch are fed to the extruder where they are combined and extruded into a marbled, multi-colored product. In some situations, suitable amounts of differently colored prefabricated granules, chips or pellets can be premixed and the premixture fed to the extruder to produce the desired multi-colored, marbled product.

Against this background, the present invention is based on the discovery that the smeary, viscous liquid-like mass produced as above described by heating the compounded thermoplastic powder mixture, if simply mixed and cooled after reachings its viscous, liquid-like state, changes from a liquid-like, viscous mass unsuitable for use as an extruder feed into pourable, fluidible, chargeable, dry, pulverous, non-caking agglomerates, which can be directly fed to an extruder. Accordingly, the present invention takes advantage of this discovery by employing as the extruder feed material, at least two batches of differently colored thermoplastic flowable agglomerates made by directly cooling and mixing the heated viscous, liquidlike, smeary compounded thermoplastic powder/plasticizer mixture produced during the compounding operation.

Thus, in accordance with the present invention, multi-colored, marbled thermoplastic shaped articles are made by alternately feeding at least two differently colored compounded batches of pourable thermoplastic fluidible agglomerates made as above described without calendering, hardening or comminuting the heated liquid-like, viscous compounded polymer mass necessary in accordance with conventional techniques. Thus, the present invention represents a significant advantage over known techniques for producing marbled, multi-colored thermoplastic objects since it eliminates the necessity for calendering or otherwise forming the smeary mass of compounded polymer into a solid article and the subsequent comminution of that article into chips, granules or pellets suitable for use as an extruder feed.

In particular, the present invention contemplates a process for the production of shaped thermoplastic articles colored in a marbled effect or fashion, which process is characterized in that at least two batches of differently colored thermoplastic sand-like agglomerates made as described above are alternately extruded through the same extruder. More specifically, the marblizing process of this invention comprises alternately introducing by means of alternatingly controlled metering means or devices metered amounts of differently colored thermoplastic sand-like agglomerates made as above described into the feed or inlet zone of an extruder, mixing the differently-colored thermoplastic materials in the extruder, and then extruding the resulting marbled mixture from the extruder to form the desired marbled shaped thermoplastic product.

In this manner, a marbled structure or product can be obtained without having to produce prefabricated granules, chips or pellets as accomplished in conventional prior art techniques.

The marbled effects produced by the present invention can be attained on single-screw as well as on multi-screw extruders. It will be appreciated that the extruder can be fed the differently colored sand-like agglomerates via metering chutes, metering scales, or via vibrating metering screws. The accuracy with which the metering devices operate also determines the reproduceability of the color effects. For a marbling or mottling effect to be formed from two basic colors by use of different color-imparting substances, for example black and white, two metering devices or means are required. Each metering device is adjusted to the desired, or also optimum, efficiency of the extruder. For example, the feed rate and duration of operation of each metering device is adjusted to the discharge rate of the extruder. In this connection, one metering device conveys or feeds the black-colored thermoplastic agglomerate, and the other device feeds the white-colored thermoplastic agglomerate.

Both metering devices are alternatingly switched on and off by means of time control clocks or other appropriate timer means. The time ratio, in seconds, used for switching the devices on and off determines the extent and intensity of the desired color hue, in case of a predetermined proportion of color and constant conveying speed. In this connection, it will be understood that the process of this invention is not limited to the use of two colors, but can be expanded or increased with each additional metering device by one or more colors, such as red, green, blue, yellow, brown, orange, and the like. Thus, various multi-colored products in which the colors are arranged in a marbled fashion may be obtained. Also, pigments, dyes, and other colorants may be employed to impart color to the thermoplastic materials.

In carrying out the inventive process, the amount of lubricants, pigments, dyes and other conventional ingredients added to the thermoplastic powder are conventional and well known in the art. Moreover, the amount of plasticizer added should be sufficient so that the powdered thermoplastic material together with the lubricants, dyes, pigments and so forth, if any, added thereto forms a smeary, compact, highly viscous, liquid-like mass when heated to an elevated temperature. As appreciated by those skilled in the art, the specific amounts of plasticizers, lubricants, pigments, dyes and so forth added to the thermoplastic powder are dependent on the final product to be produced and can be varied over wide ranges.

In this regard, the amount of plasticizer added to the thermoplastic powder and the temperature to which the compounded thermoplastic powder mass should be heated during compounding are parameters known to those skilled in the art or readily obtainable by simple experimentation. In particular, it is already known that when a thermoplastic powder mass together with lubricants, dyes, pigments and so forth is mixed with a plasticizer for the plastic powder and heated to a high enough temperature, the plastic powder particles become superficially expanded by the action of the plasticizer and the thus partially expanded particles become superficially sintered by the action of the heat. The thus partially expanded and sintered plastic particles, as a mass, are in a smeary state resembling a very viscous liquid. Moreover, it is also known that the temperature to which the mixture must be heated before transforming into a smeary, liquid-like mass is dependent on the amount of plasticizer in the mixture, the more plasticizer in the mixture, the lower the temperature needed to cause the transformation and conversely, the less the plasticizer, the higher the temperature needed to cause the transformation. The amount of plasticizer added to the thermoplastic powder and the temperature to which the mass is heated in accordance with the present invention should be sufficient to cause this superficial expansion and sintering of the thermoplastic powder particles so that the mass as a whole is in this smeary, viscous, liquid-like state.

Also, it should be appreciated that a significant amount of the heat necessary to raise the temperature of the thermoplastic powder to the necessary level is generated by frictional contact of the ingredients in the mixture during the mixing operation. Accordingly, in some situations, it is unnecessary to externally supply heat to the compounded thermoplastic mass since frictional heat will be sufficient to raise the temperature to the sintering point. In other situations, however, additional heat can be externally supplied to the mixture by conventional means to raise the temperature of the mixture to the necessary level.

Once the thermoplastic powder mass changes in form to a smeary, viscous liquid state by the action of heat, it is then cooled in accordance with the present invention to a suitable temperature, mixing of the mass being continued during the cooling operation. As indicated above, mixing and cooling causes the heated liquid-like mass of superficially expanded and sintered particles to change its form to a mass of pourable, fluidible, chargeable, dry, pulverous, non-caking agglomerates, which in the aggregate resemble wet sand in rheological characteristics. This material, which is composed of a mass of small rounded particles exhibiting sintered surfaces is readily flowable and has a powdery to finely granular consistency. Accordingly, this material makes an ideal feed for an extruder.

The exact temperature to which the heated, smeary viscous liquid mass is cooled should be sufficient to cause the mass to change its form to the pourable, fluidible, dry, pulverous, non-caking agglomerate composition described above. This temperature is dependent upon the particular polymer being process, and can be readily determined by those skilled in the art.

For illustrative purposes, it should be noted that when polyvinylchloride plastic powder is processed in accordance with the present invention in combination with a plasticizer of dioctylphthalate, the plastic mass should be heated to a temperature of about 160°C to form the plasticized thermoplastic powder into the smeary, viscous liquid mass and thereafter cooled to a temperature of about 35°C to form the mass into a pourable, dry, pulverulent state.

The colored thermoplastic sand-like agglomerates can be produced in accordance with the present invention in any apparatus which can cool the heated thermoplastic smeary, viscous, liquid mass to the desired temperature and which can further mix the mass during the cooling operation. For example, a conventional cooler/mixer or a PVC (i.e. a polyvinyl chloride) mixer made available by the firm of Henschel, Kassel [W. Germany] can be employed. Moreover, cooling can be accomplished in the same apparatus in which the original compounding and mixing occurred or in a separate vessel.

The following example is provided to illustrate a specific embodiment of the present invention.

EXAMPLE

In this example, the following ingredients are used to form a suitable thermoplastic extrudate material:
  80 parts by weight of soft PVC, produced according to the suspension method, having a K-value of 70 (described in *Ullmanns Encyklopaedie der technischen Chemie*, 3rd Ed., Urban Schwarzenberg, Munich-Berlin 1963, Vol. 14, p. 110),
  20 parts by weight of dioctyl phthalate,
  2 parts by weight of a tin-sulfur stabilizer,
  10 parts by weight of chalk (i.e. $CaCO_3$),
  0.3 part by weight of OP-wax (product designation by BASF, the German firm Badische Anilin-und Soda-Fabrik for a partially saponified ester used as a lubricant).

These ingredients are mixed, for being colored white, with an addition of 3 parts by weight of titanium dioxide or, for being colored black, with an addition of 0.8 part by weight of carbon black pigment in a Henschel mixer for about 15 to 20 minutes at a temperature up to about 160°C and then cooled in a cooling mixer for about 20 minutes to 35°C. In this manner, a uniformly flowable, i.e. fluid-like product is obtained. It will be understood that the particles of the powdered PVC are, on one hand, superficially expanded by the plasticizer added, i.e. dioctyl phthalate, and on the other hand, superficially sintered by the heating occurring due to the friction produced in the mixing operation.

The colored thermoplastic agglomerates are then dispensed alternatingly in accordance with a desired program, via two vibrating metering screws controlled by switching clocks or timer devices into the feed opening of a twin-screw extruder.

Each of the metering devices consists of a funnel, a screw barrel or housing with an exchangeable metering screw, drive motor, and an oilhydraulic gear unit with an infinitely variable speed of rotation. The metering screw is mounted on a vibrator in such a manner that the screw, the housing, the outlet pipe, and the screw bearing vibrate while the screw is simultaneously operating in a rotating motion.

The twin screws of the extruder had a diameter of 100 mm, a length of 15 D, where D is the diameter, and were designed as three-zone screws with a one-pitch feed section (zone I), a plasticizing zone with radial compression (zone II), and a multiple-pitch ejection zone (zone III).

The operation was conducted without screens and breaker plate, in order to obtain differentiated color hues and to keep the homogenization of the plasticized polyvinyl chloride material from becoming too thorough. The die arrangement employed on the extruder was a fishtail die of 500 mm with open dam-up cores and a lip slot of 0.75 mm. The film exiting from this die having a thickness of 1.1 to 1.3 mm, was cooled via a film windup device and then comminuted into scales or flakes and chips.

It is to be appreciated that the process conditions are dependent on the type and composition of the colored thermoplastics. The colored batches employed in this example were processed under the following conditions:

| Colored Thermoplastic Agglomerate | Metering Rhythm in Seconds | | | | |
|---|---|---|---|---|---|
| white | 96 | 90 | 80 | 60 | 30 |
| black | 4 | 10 | 20 | 40 | 70 |

The respective setting, in seconds, was maintained constant as long as a specific marbling effect was desired. The metering screws of each metering device were set to the same conveying rate which was adapted to the extruder efficiency. In other words, the total conveying rate of both metering devices was equal to the extruder discharge rate or extruder efficiency. In this example at the beginning, the white-pigmented agglomerate was introduced for 4 seconds, alternately, in metered quantities, in a uniform rhythm. Each further chronological variation up to a 30/70 ratio of white to black in the metering rhythm resulted in a change from a white/light-grey marbling, via certain intermediate color stages, to a grey/black marbling. Depending on the adjustment of the rhythm, the marbled thermoplastic structures exhibited well recognizable differentiations in color. Also, it will be appreciated that instead of keeping the conveying rate of each metering device constant, and varying the duration or time period, the rate may be varied and the time kept constant; the former procedure however is preferred for ease of operation and control. Also, in some cases, equal metering rates and equal times may be alternately utilized to produce a desired marbled effect, depending upon the frequency of the change from one colored thermoplastic to another.

The feed zone (zone I) of the extruder was cooled. The extruder screw rotated at 30 r.p.m. In this example, an ejection efficiency of 180 kg/hour was obtained. The extruder settings were:

| | Temperature, °C |
|---|---|
| Zone I | 165 |
| Zone II | 180 |
| Zone III | 185 |
| Flange and intermediate portion | 185 |
| Die, side | 185 |
| intermediate center section | 180 |
| center section | 180 |
| intermediate center section | 180 |
| side | 185 |

The resultant marbled sheets can be further processed into plates, scales or irregularly shaped chips, and thus result in materials which can be utilized for floor and wall coverings due to their decorative effects.

It will be appreciated that various thermoplastic materials may be used to form the marbled products of this invention. Exemplary of some suitable thermoplastics are vinyl resin, e.g. polyvinyl chloride, polystyrene, polyvinyl acetate, copolymers of vinyl chloride and vinyl acetate, and the like, polyethylene, polypropylene, and cellulose and acrylic resins. Moreover, although the invention has been described with reference to an embodiment where the same thermoplastic materials (each differently colored) are alternately introduced into the extruder, different incompatible thermoplastic materials may be used to produce a multicolor, multi-component shaped product having a marbled effect. Moreover, it should also be appreciated that any known plasticizer for the particular thermoplastic resin employed in the inventive process can be employed as the plasticizer in the present invention. Examples of suitable plasticizers are phthalates, such as di-n-octyl phthalates, diethyl-hexyl phthalates, mixtures of $C_7$–$C_9$ alcohol phthalates and $C_9$–$C_{11}$ alcohol phthalates, adipates, sebacates, phosphates, polymer plasticizers, and so forth.

While the novel principles of the invention have been described, it will be understood that various omissions, modifications and changes in these principles may be made by one skilled in the art without departing from the spirit and scope of the invention.

What we claim is:

1. A process for the production of shaped, marbled thermoplastic products wherein differently colored thermoplastic materials are separately introduced into an extruder having a feed zone, and ejection zone and a die means arranged in series with a rotatable conveying means extending through said zones and the materials are extruded from the die means, said process comprising producing at least two batches of differently colored thermoplastic materials in the form of pourable, fluidible, chargeable, pulverous, non-caking agglomerates, each batch produced by mixing a powdered thermoplastic resin, a coloring agent to impart a desired color to the powdered thermoplastic resin, a plasticizer for the thermoplastic resin, a stabilizer and a filler, mixing the resultant mixture, causing the temperature of said mixture to increase to an elevated temperature, the amount of plasticizer added to the mixture and the extent to which the temperature of the mixture is elevated being sufficient so that the thermoplastic resin particles superficially expand and are superficially sintered to one another to form a smeary, viscous-liquid-like mass, and then cooling and simultaneously mixing the resultant mass until said mass is formed into said agglomerates; alternately introducing the differently colored thermoplastic materials in each batch in the form of flowable thermoplastic agglomerates into the feeding zone of said extruder by means of separately operated vibrating metering means, each differently colored thermoplastic material being fed to said feed zone by its own metering means; mixing each of the thermoplastic materials in and conveying the thermoplastic materials through said zone of the extruder via said conveying means; cooling the feed zone of the extruder and heating the ejection zone of the extruder above the melting point of the thermoplastic material but below the decomposition temperature of the thermoplastic material; and thereafter extruding the resultant mixture of the differently colored thermoplastic materials from the die means to form the desired shaped, marbled product.

2. The process according to claim 1, wherein said vibrating metering means are vibrating metering screws.

3. The process according to claim 2, wherein said extruder is free of screens and braker plates.

4. The process according to claim 1, wherein each of the differently colored thermoplastic materials is introduced into the extruder at the same rate for different periods of time.

5. The process according to claim 4, wherein said periods of time are chronologically varied during the extrusion to produce varying degrees of color contrast in the resultant marbled product.

6. The process according to claim 1, wherein said elevated temperature is about 160°C and further wherein said thermoplastic materials are cooled to a temperature of about 35°C.

7. The process according to claim 6, wherein said thermoplastic material is polyvinyl chloride.

8. The process according to claim 1, wherein said thermoplastic material is polyvinyl chloride.

9. The process according to claim 1, wherein metered amounts of each of the differently colored thermoplastic materials are alternately fed into said feed zone at equal rates for equal periods of time.

10. The process according to claim 1, wherein said extruder includes a plasticizing zone between the feed zone and ejection zone, said plasticizing zone being heated above the melting point of the thermoplastic material but below the decomposition temperature of the thermoplastic material.

11. The process according to claim 1, wherein the temperature of said mixture is caused to increase to said elevated temperature by the frictional heat created during mixing of said mixture only.

12. The process according to claim 1, wherein the temperature of said mixture is caused to increase to said elevated temperature by the frictional heat created during mixing of said mixture and by externally heating said mixture.

13. A process for the production of multi-colored, marbled solid thermoplastic articles comprising:

a. alternately feeding at least two batches of differently-colored, pourable, fluidible, chargeable, dry, pulverous, non-caking thermoplastic resin agglomerates to an extruder, each batch of thermoplastic agglomerates being formed by (i) mixing a thermoplastic powder with a sufficient amount of coloring agent to impart the desired color to said thermoplastic powder and a plasticizer for said thermoplastic resin, the amount of plasticizer added to said thermoplastic resin powder being sufficient to cause the thermoplastic resin powder particles to superficially expand when heated, (ii) mixing and simultaneously heating the mixture of thermoplastic resin powder, coloring agent, and plasticizer to a temperature sufficient to cause the superficially expanded thermoplastic resin particles to be superficially sintered together whereby said mixture is formed into a smeary, viscous liquid mass, and (iii) mixing and simultaneously cooling said mixture to a temperature at which said mixture becomes a pourable, fluidible, chargeable, dry, pulverous, non-caking mass of agglomerates, and b. extruding said agglomerates into a solid thermoplastic article.

14. The process according to claim 13, wherein said thermoplastic powder is polyvinylchloride.

15. The process according to claim 14, wherein said plasticizer is dioctyl phthalate.

16. The process according to claim 13, wherein each batch of flowable thermoplastic agglomerates is fed to said extruder by means of a vibrating screw.

17. The process according to claim 13, wherein the amount of pourable agglomerates from each batch fed to said extruder are the same.

18. The process according to claim 13, wherein thermoplastic agglomerates from each batch are alternately fed to said extruder in such a way that the relative amounts of differently colored thermoplastic resins in a shaped articles produced by the said process varied with time.

19. The process according to claim 13, wherein heating is accomplished by the frictional heat created during mixing.

20. The process according to claim 19, wherein the mixture is additionally externally heated during mixing.

21. The process according to claim 13, wherein said mixture further includes fillers and stabilizers.

22. In a process for producing a marbled multicolored thermoplastic object in which a thermoplastic resin powder is compounded with a plasticizer and a dye or pigment to form a compounded thermoplastic resin composition, the compounded thermoplastic resin composition is heated to an elevated temperature to form a viscous smeary mass, the viscous smeary mass is cooled and formed into a pourable, non-caking, fluidable extruder feed material, and the pourable extruder feed material is extruded to form said object, the improvement wherein a. a first portion of said viscous smeary mass is directly formed into a first batch of extruder feed material by mixing and cooling without forming said first portion of viscous smeary mass into a shaped article or comminuting the shaped article into prefabricated, granules, chips or pellets, b. a second portion of said viscous smeary mass is directly formed into a second batch of extruder feed material having a color different from said first batch by mixing and cooling without forming said second portion of viscous smeary mass into a shaped article or comminuting the shaped article into prefabricated granules, chips or pellets, and c. said first batch and second batch in the form of pourable, non-caking agglomerates are alternately and directly fed to said extruder.

23. The process of claim 22, wherein said first and second batches of extruder feed material are fed to said extruder by means of vibrating feeding means.

24. The process of claim 23, wherein said first and second batches of said extruder feed material are fed to said extruder by means of vibrating screws.

25. The process of claim 23, wherein said thermoplastic resin powder is polyvinyl chloride.

26. The process of claim 25, wherein the thermoplastic resin powder when compounded with said dye or pigment is heated to a temperature of about 160°C. and thereafter cooled to a temperature of about 35°C.

27. The process of claim 22 wherein said compounded thermoplastic resin composition further includes a lubricant.

* * * * *